United States Patent
Kuo

(10) Patent No.: US 10,047,008 B2
(45) Date of Patent: Aug. 14, 2018

(54) LOW-TO-MID RANGE WATER-REDUCING POLYMER WITH MIXED POLYOXYALKYLENE SIDE CHAINS

(71) Applicant: GCP Applied Technologies Inc., Cambridge, MA (US)

(72) Inventor: Lawrence L. Kuo, Acton, MA (US)

(73) Assignee: GCP Applied Technologies Inc., Cambridge, MA (US)

( * ) Notice: Subject to any disclaimer, the term of this patent is extended or adjusted under 35 U.S.C. 154(b) by 0 days.

(21) Appl. No.: 15/144,958

(22) Filed: May 3, 2016

(65) Prior Publication Data

US 2017/0320777 A1 Nov. 9, 2017

(51) Int. Cl.
*C04B 24/26* (2006.01)

(52) U.S. Cl.
CPC .............................. *C04B 24/2694* (2013.01)

(58) Field of Classification Search
CPC ................................................ C04B 24/2694
USPC ............................................................ 524/5
See application file for complete search history.

(56) References Cited

U.S. PATENT DOCUMENTS

| | | |
|---|---|---|
| 5,156,679 A | 10/1992 | Gartner et al. |
| 6,139,623 A | 10/2000 | Darwin et al. |
| 6,187,841 B1 | 2/2001 | Tanaka et al. |
| 6,294,015 B1 * | 9/2001 | Yamashita .......... C04B 24/2647 106/724 |
| 6,545,067 B1 | 4/2003 | Buchner et al. |
| 6,569,924 B2 | 5/2003 | Shendy et al. |
| 6,803,396 B2 | 10/2004 | Gopalkrishnan |
| 6,858,661 B2 | 2/2005 | Zhang et al. |
| 8,187,376 B2 | 5/2012 | Kuo et al. |
| 2006/0223914 A1 * | 10/2006 | Yuasa ................. C04B 24/2647 524/2 |
| 2011/0166261 A1 | 7/2011 | Lorenz et al. |
| 2012/0046392 A9 | 2/2012 | Lorenz et al. |
| 2016/0090323 A1 | 3/2016 | Kuo et al. |

FOREIGN PATENT DOCUMENTS

| | | |
|---|---|---|
| EP | 0415799 | 6/1991 |
| EP | 0850894 | 1/1998 |
| JP | 2000327384 | 11/2000 |
| JP | 2001302305 | 10/2001 |

* cited by examiner

*Primary Examiner* — Josephine L Chang

(74) *Attorney, Agent, or Firm* — Craig K. Leon

(57) ABSTRACT

Methods for plasticizing cementitious mixtures having relatively high water/cement ratio (at least 0.40 or higher) are surprisingly improved in terms of dosage efficiency, compared to conventional "superplasticizer" polycarboxylate polymers, when the comb-type carboxylate copolymer is formed from two different polyether side chains having specifically selected monomer constituents.

20 Claims, No Drawings

LOW-TO-MID RANGE WATER-REDUCING POLYMER WITH MIXED POLYOXYALKYLENE SIDE CHAINS

FIELD OF THE INVENTION

The present invention relates to modification of hydratable cementitious compositions; and, more particularly, to water-reducing plasticization of concrete or mortar having a specific water/cement ratio range using a polycarboxylate-containing comb type polymer comprising two different but specific size ranges within polyoxyalkylene-containing pendant groups to permit effective modification in low-to-mid-range water reduction applications.

BACKGROUND OF THE INVENTION

It is known that water-reducing chemical admixtures reduce the amount of water used for plasticizing concrete mixes such that the concrete requires less water to reach a given slump as compared to untreated concrete. A lower water-to-cement ratio (w/c) can lead to higher strength concrete without increasing the cement amount.

It is also known that polycarboxylate ("PC") type cement dispersants are popularly used for high range water reduction ("HRWR") applications in which water content is reduced by 12-30 percent compared to concrete that is untreated. HRWR plasticizers are referred to as "superplasticizers" and allow concrete to be highly fluid and to be placed quickly at the job site with little or no compaction effort.

For example, U.S. Pat. No. 6,187,841 of Tanaka et al. disclosed PC copolymers which functioned as HRWR dispersants and which were made from (alkoxy)polyalkylene glycol mono(meth)acrylic ester type monomers and (meth) acrylic acid type monomers, and they emphasized that large molecular sizes were required in order for the HRWR dispersant to achieve ideal water reduction capabilities.

In another example, EP 0 850 894 B1 of Hirata et al. disclosed PC copolymers which functioned as HRWR dispersants and which were made from polyalkylene glycol ether-based monomers and maleic acid based monomers. Similar to Tanaka et al., Hirata et al. disclosed molecular size ranges extending upwards to 100,000 and expressed a strong preference for using a large number of alkylene oxide groups.

In US Patent Application Publications US 2011/0166261 A1 and US 2012/0046392 A9, Lorenz et al. disclosed a PC copolymer comprising four components of an unsaturated dicarboxylic acid, an unsaturated alkenyl ether having 1 to 25 oxyalkylene units, an unsaturated alkenyl ether having 26 to 300 oxyalkylene units, and an unsaturated monomer comprising a hydrolysable moiety. This reference indicates that the copolymer demonstrated a lower binding affinity with cement particles initially and could be overdosed into the cementitious composition initially to obtain workability. Over time, the hydrolysable moieties become saponified, resulting the retention of the workability in the cementitious composition.

It is the belief of the present inventor that for low-to-mid range applications, wherein it may not be necessary or desirable to replace a large amount of water in certain concrete or mortar mixes, that the PC copolymers taught in the above prior art references do not confer sufficient initial workability to the concrete or mortar mixes.

It seems that most of the prior art in the field of PC copolymers for cement dispersant applications are intended for HRWR purposes wherein a large water cut is achieved such that the cementitious compositions have low water-to-cement ratios. As another example, in Japan Laid Open JP 2001/302305, Yamashita et al. disclosed a PC copolymer comprising an alkenyl ether having 1 to 100 oxyalkylene groups, an alkenyl ether having 11 to 300 oxyalkylene groups, and an unsaturated carboxylic acid. Again, one reads that Yamashita et al. expressly preferred superplasticizing (i.e., HRWR) applications wherein a very large water cut is achieved in the cementitious composition; and, indeed, one can see in the examples that this reference teaches very low water-to-cement ratios (e.g., 0.25-0.30 w/c) which would be much lower compared to low-to-mid-range water reduction applications.

In contrast to the extensive polycarboxylate polymer size and weight ranges taught in these exemplary art references, the present inventor believes that PC copolymers have not been sufficiently explored for low-to-mid-range plasticization, because the concrete industry has become accustomed to using the more expensive polycarboxylate (PC) type copolymers for HRWR applications, while using non-PC cement dispersants, such as lignin type plasticizers, primarily for low-to-mid-range applications. It appears that in the concrete industry, therefore, PC type copolymers are reserved customarily for high range water reduction (HRWR) applications, i.e., for achieving the 12 to 30 percent reduction in hydration water.

The present inventor has recently attempted to buck this trend. For example, in US Publication No. 2016/0090323 (owned by the common assignee hereof), Kuo et al. disclosed a method for achieving low-to-mid-range water reduction in hydratable cementitious compositions having a water/cement ratio of 0.40-0.80, wherein the method involves using one or more PC copolymers made from a polyoxyalkylene monomer, an unsaturated carboxylic acid monomer, and, optionally, an unsaturated water-soluble hydrophilic monomer.

It is an objective of the present invention to provide an alternative to lignin type water reducers and to provide an alternative low-range and mid-range water reduction approach to Kuo et al. in US Publication No. 2016/0090323, by using a polycarboxylate comb-type that achieves admixture dosage efficiency at lower water cuts (i.e., below 12 percent water cut) as compared to lignin type water reducers and conventional (e.g., larger, commercial-scale) polycarboxylate type polymers that are typically used for high range water reduction (HRWR) applications.

SUMMARY OF THE INVENTION

In pushing against the industry trend of using large-sized polycarboxylate (PC) comb type copolymers for high range water reduction (HRWR) in cementitious compositions, the present inventor believes that using a PC copolymer having two different but specific size ranges within its polyoxyalkylene-containing pendant groups, despite achieving inferior HRWR performance as compared to conventional superplasticizers which are otherwise used in low water-to-cement (w/c) compositions, provides superior performance surprisingly and unpredictably when W/C is increased; such that the present invention provides a satisfactory alternative to lignin and other non-PC type dispersants when used in low-to-mid range water reduction applications (LRWR, MRWR).

In providing a performance improvement over prior art PC type "superplasticizers" or HRWR cement dispersant polymers, the present invention describes a method for achieving low-to-mid-range reduction of water in concrete or mortar mixes using specifically sized PC copolymer constituents.

The present invention also reflects an unexpected and surprising improvement, in terms of admixture dosage efficiency at certain high water-cement (w/c) ratios, when PC copolymers taught by the present invention were compared to commercial reference PC polymers used in conventional HRWR applications.

Thus, an exemplary method of the present for achieving low-to-mid-range water-reducing of a hydratable cementitious composition using a comb-type carboxylate copolymer, comprises:

combining with water and hydratable cement, to form a hydratable mixture having a water/cement (w/c) ratio of at least 0.44 and more preferably at least 0.51, and wherein the w/c ratio is no greater than 0.80 and more preferably no greater than 0.75, at least one comb-type carboxylate copolymer formed from the following monomer components (A), (B), (C), and optionally (D):

(A) a first polyoxyalkylene monomer represented by structural formula:

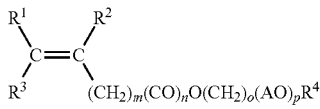

wherein $R^1$ and $R^2$ individually represent hydrogen atom or methyl group; $R^3$ represents hydrogen or —COOM group wherein M represents a hydrogen atom or an alkali metal; AO represents oxyalkylene group having 2 to 4 carbon atoms (preferably 2 carbon atoms) or mixtures thereof; "m" represents an integer of 0 to 2; "n" represents an integer of 0 or 1; "o" represents an integer of 0 to 4; "p" represents an average number of oxyalkylene groups and is an integer from 5 to 35; and $R^4$ represents a hydrogen atom or $C_1$ to $C_4$ alkyl group;

(B) a second polyoxyalkylene monomer represented by structural formula:

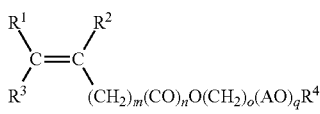

wherein $R^1$ and $R^2$ individually represent hydrogen atom or methyl group; $R^3$ represents hydrogen or —COOM group wherein M represents a hydrogen atom or an alkali metal; AO represents an oxyalkylene group having 2 to 4 carbon atoms (preferably 2 carbon atoms) or mixtures thereof; "m" represents an integer of 0 to 2; "n" represents an integer of 0 or 1; "o" represents an integer of 0 to 4; "q" represents an average number of oxyalkylene groups and is an integer from 20 to 200; and $R^4$ represents a hydrogen atom or $C_1$ to $C_4$ alkyl group;

(C) an unsaturated carboxylic acid monomer represented by structural formula:

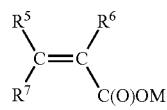

wherein $R^5$ and $R^6$ individually represent hydrogen atom or methyl group; $R^7$ represents hydrogen atom, $C(O)OR^8$, or $C(O)NH\ R^8$ wherein $R^8$ represents a $C_1$ to $C_4$ alkyl group, and M represents a hydrogen atom or an alkali metal; and, optionally, (D) an unsaturated, water-soluble monomer represented by structural formula:

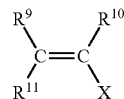

wherein $R^9$, $R^{10}$, and $R^{11}$ each independently represent a hydrogen atom, methyl group or $C(O)OH$; X represents $C(O)NH_2$, $C(O)NHR^{12}$, $C(O)NR^{13}R^{14}$, $O-R^{15}$, $SO_3H$, $C_6H_4SO_3H$, or $C(O)NHC(CH_3)_2CH_2SO_3H$, or mixture thereof, wherein $R^{12}$, $R^{13}$, $R^{14}$, and $R^{15}$ each independently represent a $C_1$ to $C_5$ alkyl group; and wherein the molar ratio of component (A) to component (B) is from 15:85 to 85:15, and further wherein the molar ratio of component (C) to the sum of component (A) and component (B) is 90:10 to 50:50.

In preferred embodiments, the copolymer formed from components (A), (B), (C), and optionally (D) has a weight-average molecular weight of 8,000-50,000, more preferably 10,000-40,000, and most preferably 12,000-30,000, as measured by gel permeation chromatography (using polyethylene glycol as standards and with conditions described in further detail hereinafter). The present invention also relates to cementitious compositions, including concrete and mortar, made according to the exemplary method described above.

Further benefits and features of the invention will be discussed in further greater hereinafter.

DETAILED DESCRIPTION OF EXEMPLARY EMBODIMENTS

As summarized previously, the present invention provides a method and cementitious compositions whereby low-to-mid range water reduction is achieved using specific structures and sizing within the comb-type carboxylate polymer structure.

The term "cementitious" refers to materials that comprise Portland cement or which otherwise function as a binder to hold together fine aggregates (e.g., sand), coarse aggregates (e.g., crushed gravel), or mixtures thereof. The term "cement" refers to hydraulic binder material such as Portland cement which is produced by pulverizing clinker consisting of hydraulic calcium silicates and one or more forms of calcium sulfate (e.g., gypsum) as an interground additive. Typically, Portland cement is combined with one or more supplemental cementitious materials, such as fly ash, granulated blast furnace slag, limestone, natural pozzolans, or mixtures thereof, and provided as a blend.

The term "hydratable" as used herein refers to cement and/or cementitious materials that are hardened by chemical interaction with water. Portland cement clinker is a partially fused mass primarily composed of hydratable calcium silicates. The calcium silicates are essentially a mixture of tricalcium silicate ($3CaO.SiO_2$ "$C_3S$" in cement chemists notation) and dicalcium silicate ($2CaO.SiO_2$, "$C_2S$") in which the former is the dominant form, with lesser amounts of tricalcium aluminate ($3CaO.Al_2O_3$, "$C_3A$") and tetracalcium aluminoferrite ($4CaO.Al_2O_3.Fe_2O_3$, "$C_4AF$"). See e.g., Dodson, Vance H., *Concrete Admixtures* (Van Nostrand Reinhold, New York N.Y. 1990), page 1.

The term "concrete" as used herein refers generally to a hydratable cementitious mixture comprising water, cement, sand, a coarse aggregate such as crushed gravel or stone, and one or more optional chemical admixtures.

As used herein, the term "copolymer" or "polymer" refers to compounds containing constituents derived or formed from the use of three different monomer components (designated as components "A", "B", and "C") and optionally from the use of four different monomer components (i.e., further including at least one optional monomer designated as "D"), as described in exemplary methods of the invention and cementitious compositions made by the methods of the invention.

Thus, an exemplary method of the present invention comprises: combining with water and hydratable cement, to form a hydratable mixture having a water/cement (w/c) ratio of at least 0.44 and more preferably at least 0.51, and wherein the w/c ratio is no greater than 0.80 and more preferably no greater than 0.75, at least one comb-type carboxylate copolymer having the following monomeric constituents:

(A) a first polyoxyalkylene monomer represented by structural formula:

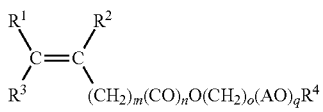

wherein $R^1$ and $R^2$ individually represent hydrogen atom or methyl group; $R^3$ represents hydrogen or —COOM group wherein M is a hydrogen atom or an alkali metal; AO represents oxyalkylene group having 2 to 4 carbon atoms (preferably 2 carbon atoms) or mixtures thereof; "m" represents an integer of 0 to 2; "n" represents an integer of 0 or 1; "o" represents an integer of 0 to 4; "p" represents an average number of oxyalkylene groups and is an integer from 5 to 35; and $R^4$ represents a hydrogen atom or $C_1$ to $C_4$ alkyl group;

(B) a second polyoxyalkylene monomer represented by structural formula:

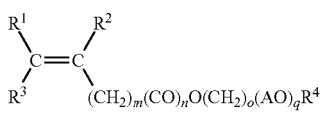

wherein $R^1$ and $R^2$ individually represent hydrogen atom or methyl group; $R^3$ represents hydrogen or —COOM group wherein M is a hydrogen atom or an alkali metal; AO represents oxyalkylene group having 2 to 4 carbon atoms (preferably 2 carbon atoms) or mixtures thereof; "m" represents an integer of 0 to 2; "n" represents an integer of 0 or 1; "o" represents an integer of 0 to 4; "q" represents an average number of oxyalkylene groups and is an integer from 20 to 200; and $R^4$ represents a hydrogen atom or $C_1$ to $C_4$ alkyl group;

(C) an unsaturated carboxylic acid monomer represented by structural formula:

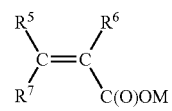

wherein $R^5$ and $R^6$ individually represent hydrogen atom or methyl group; $R^7$ represents hydrogen atom, $C(O)OR^8$, or $C(O)NHR^8$ wherein $R^8$ is $C_1$ to $C_4$ alkyl group, and M is a hydrogen atom or an alkali metal; and, optionally, (D) an unsaturated, water-soluble monomer represented by structural formula:

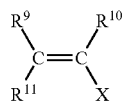

wherein $R^9$, $R^{10}$, and $R^{11}$ each independently represent a hydrogen atom, methyl group or $C(O)OH$; X represents $C(O)NH_2$, $C(O)NHR^{12}$, $C(O)NR^{13}R^{14}$, $SO_3H$, $C_6H_4SO_3H$, or $C(O)NHC(CH_3)_2CH_2SO_3H$, or mixture thereof, wherein $R^{12}$, $R^{13}$, $R^{14}$, and $R^{15}$ each independently represent a $C_1$ to $C_5$ alkyl group; and wherein the molar ratio of component (A) to component (B) is from 15:85 to 85:15, and further wherein the molar ratio of component (C) to the sum of component (A) and component (B) is 90:10 to 50:50.

In exemplary methods of the present invention, the hydratable cementitious mixture is a concrete (which typically contains both a fine aggregate such as sand, and a coarse aggregate such as stones or crushed gravel) designed for low-to-mid range water reduction applications, wherein the cement-to-concrete ratio is 240 to 340 kg/m³. This contrasts with concretes typically used with superplasticizers designed for high range water reduction (HRWR) wherein the cement-to-concrete is usually at least 350 formed from the following monomer components (A), (B), (C), and optionally (D):

(A) a first polyoxyalkylene monomer represented by structural formula:

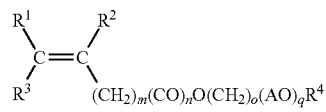

wherein $R^1$ and $R^2$ individually represent hydrogen atom or methyl group; $R^3$ represents hydrogen or —COOM group wherein M represents a hydrogen atom or an alkali metal; AO represents oxyalkylene group having 2 to 4 carbon atoms (preferably 2 carbon atoms) or mixtures thereof; "m" represents an integer of 0 to 2; "n" represents an integer of 0 or 1; "o" represents an integer of 0 to 4; "p" represents an average number of oxyalkylene groups and is an integer from 5 to 35; and $R^4$ represents a hydrogen atom or $C_1$ to $C_4$ alkyl group;

(B) a second polyoxyalkylene monomer represented by structural formula:

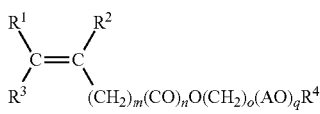

wherein $R^1$ and $R^2$ individually represent hydrogen atom or methyl group; $R^3$ represents hydrogen or —COOM group wherein M represents a hydrogen atom or an alkali metal; AO represents an oxyalkylene group having 2 to 4 carbon atoms (preferably 2 carbon atoms) or mixtures thereof; "m" represents an integer of 0 to 2; "n" represents an integer of 0 or 1; "o" represents an integer of 0 to 4; "q" represents an average number of oxyalkylene groups and is an integer from 20 to 200; and $R^4$ represents a hydrogen atom or $C_1$ to $C_4$ alkyl group;

(C) an unsaturated carboxylic acid monomer represented by structural formula:

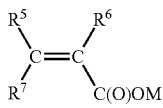

wherein $R^5$ and $R^6$ individually represent hydrogen atom or methyl group; $R^7$ represents hydrogen atom, $C(O)OR^8$, or $C(O)NH\ R^8$ wherein $R^8$ represents a $C_1$ to $C_4$ alkyl group, and M represents a hydrogen atom or an alkali metal; and, optionally, (D) an unsaturated, water-soluble monomer represented by structural formula:

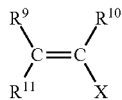

wherein $R^9$, $R^{10}$, and $R^{11}$ each independently represent a hydrogen atom, methyl group or $C(O)OH$; X represents $C(O)NH_2$, $C(O)NHR^{12}$, $C(O)NR^{13}R^{14}$, $O—R^{15}$, $SO_3H$, $C_6H_4SO_3H$, or $C(O)NHC(CH_3)_2CH_2SO_3H$, or mixture thereof, wherein $R^{12}$, $R^{13}$, $R^{14}$, and $R^{15}$ each independently represent a $C_1$ to $C_5$ alkyl group; and wherein the molar ratio of component (A) to component (B) is from 15:85 to 85:15, and further wherein the molar ratio of component (C) to the sum of component (A) and component (B) is 90:10 to 50:50.

In further exemplary embodiments, the molar ratio of component (A) to component (B) is, preferably, from 15:85 to 85:15; more preferably, from 20:80 to 75:25; and, most preferably, from 25:75 to 65:35.

In other exemplary embodiments, the letters "m," "n," and "o" in monomer components (A) or (B) are integers of 0, 1, and 0, respectively.

In further exemplary embodiments, the molar ratio of component (C) to the sum of component (A) and component (B) ranges from 90:10 to 50:50, more preferably from 80:20 to 60:40, and most preferably from 75:25 to 65:35. When component (D) is present, the molar ratio of component (D) to the sum of component (A), component (B), and component (C) ranges from 1:99 to 20:80 and is more preferably from 3:97 to 10:90.

In further exemplary embodiments, the sum of the number of oxyalkylene repeating unit "p" in component (A) and the number of oxyalkylene repeating unit "q" in component (B) is not more than 120, preferably not more than 80.

In further exemplary embodiments, the number of oxyalkylene repeating unit "q" in component (B) minus the number of oxyalkylene repeating unit "p" in component (A) is 8, preferably 10 or higher.

The weight-average molecular weight of the polycarboxylate copolymer is 8,000-50,000 as measured by gel permeation chromatography (GCP) using polyethylene glycol (PEG) as standards and in accordance with the GPC conditions described in Example 1 below. More preferably, the weight-average molecular weight of the polycarboxylate copolymer polymer is 10,000-40,000, and, most preferably, is 12,000-30,000. The molecular weight may be determined using Gel Permeation Chromatography (GPC) under the conditions described in Example 1 below.

The term "comprises" when used to describe the monomer components means that the comb-type carboxylate copolymer is formed from monomer components (A), (B), (C), and optionally (D) and may be formed from additional monomers (i.e., in addition to) having different structure or groups apart from what has been described for monomers (A), (B), (C), and optional (D); whereas "consists essentially of" means, depending upon context, that constituents of the polycarboxylate copolymer are formed from using monomer components (A), (B), and (C) only or from using monomer components (A), (B), (C), and (D) only. Hence, in further exemplary methods of the invention, the comb-type carboxylate copolymer may be formed using monomer components (A), (B), and (C) only.

Examples of monomers for component (A) include, but are not limited to, poly(ethylene glycol) methyl ether acrylate, poly(ethylene glycol) methyl ether methacrylate, poly (ethylene glycol) methyl ether maleate monoester, poly (ethylene glycol) methyl ether fumarate monoester, N-poly (ethylene glycol) acrylamide, N-poly(ethylene glycol) methacrylamide, poly(ethylene glycol) vinyl ether, poly (ethylene glycol) allyl ether, poly(ethylene glycol) methallyl ether, poly(ethylene glycol) isoprenyl ether, poly(ethylene glycol) vinyloxybutylene ether, wherein the number of oxyalkylene repeating units is in the range of 5 to 35, more preferably in the range of 8 to 30, and most preferably in the range of 10 to 25.

Examples of monomers for component (B) include, but are not limited to, poly(ethylene glycol) methyl ether acrylate, poly(ethylene glycol) methyl ether methacrylate, poly (ethylene glycol) methyl ether maleate monoester, poly (ethylene glycol) methyl ether fumarate monoester, N-poly (ethylene glycol) acrylamide, N-poly(ethylene glycol) methacrylamide, poly(ethylene glycol) vinyl ether, poly (ethylene glycol) allyl ether, poly(ethylene glycol) methallyl ether, poly(ethylene glycol) isoprenyl ether, poly(ethylene glycol) vinyloxybutylene ether, wherein the number of oxyalkylene repeating units is in the range of 20 to 200, more preferably in the range of 25 to 150, and most preferably in the range of 30 to 100. The number of oxyalkylene repeating units in component (B) is at least 10 more than the number of oxyalkylene repeating units in component (A).

Examples of monomer component (C) include, but are not limited to, acrylic acid, methacrylic acid, $C_1$-$C_4$ alkyl maleic monoester, N—($C_1$-$C_4$) alkyl maleic monoamide, $C_1$-$C_4$ alkyl fumaric monoester, N—($C_1$-$C_4$) alkyl fumaric monoamide, or mixtures thereof.

Examples of unsaturated, water-soluble monomer of optional monomer component (D) include, but not limited to, acrylamide, methacrylamide, N-alkyl acrylamide, N-alkyl methacrylamide, N,N-dialkyl acrylamide, N,N-dialkyl methacrylamide, vinyl alkyl ether, vinylsulfonic acid, allylsulfonic acid, methallylsulfonic acid, 3-acrylamido-2-methylpropane sulfonic acid, styrene sulfonic acid, salts of these acids, or mixtures thereof.

In further exemplary methods of the present invention, the active amount of the comb-type carboxylate copolymer, which is constituted from monomer components (A), (B), (C), and optionally (D), is combined with cement in the amount of from 0.04 to 0.14 percent by weight of the cement, and more preferably from 0.05 to 0.11 percent by weight (wt %) based on cement weight.

In still further exemplary methods of the present invention, at least one additional admixture may be added to the water and cement in addition to the comb-type carboxylate copolymer. Such admixture can be selected from the group consisting of gluconic acid or salt thereof, an alkanolamine, an air detraining agent, an air-entraining agent, and mixtures thereof. In other exemplary methods, the said at least one additional admixture is mixed with the carboxylate copolymer prior to combining with the cement and water.

A conventional air detraining (defoaming) agent may be used in combination with the polycarboxylate copolymer as contemplated within the present invention, and used in an amount as deemed necessary or desired by the admixture formulator or applicator.

As further example of air detraining agents (defoamers) which can be employed in the present invention, EP 0 415 799 B1 of Gartner taught air-detraining nonionic surfactants which included phosphates (e.g., tributylphosphate), phthalates (e.g., diisodecylphthalate), and polyoxypropylene-polyoxyethylene block copolymers (which are not deemed to be superplasticizers) (See EP 0 415 799 B1 at page 6, II. 40-53). As another example, U.S. Pat. No. 5,156,679 of Gartner taught use of alkylate alkanolamine salts (e.g., N-alkylalkanolamine) and dibutylamino-w-butanol as defoamer. U.S. Pat. No. 6,139,623 of Darwin et al. disclosed antifoaming agents selected from phosphate esters (e.g., dibutylphosphate, tributylphosphate), borate esters, silicone derivatives (e.g., polyalkyl siloxanes), and polyoxyalkylenes having defoaming properties. U.S. Pat. No. 6,858,661 of Zhang et al. disclosed a tertiary amine defoamer having an average molecular weight of 100-1500 for creating stable admixture formulations. As yet another example, U.S. Pat. No. 8,187,376 of Kuo et al., disclosed the use of a polyalkoxylated polyalkylene polyamine defoamer. All of the foregoing references, which are owned by the common assignee hereof, are incorporated herein by reference.

As another example of an air detraining agents which can be employed in the present invention, U.S. Pat. No. 6,545,067 of Buchner et al. (BASF) disclosed butoxylated polyalkylene polyamine for reducing air pore content of cement mixes. U.S. Pat. No. 6,803,396 of Gopolkrishnan et al. (BASF) disclosed low molecular weight block polyether polymers described as containing ethylene oxide and propylene oxide units as detrainers. In addition, U.S. Pat. No. 6,569,924 of Shendy et al. (MBT Holding AG) disclosed the use of solubilizing agents for solubilizing water-insoluble defoamers.

Thus, it is believed that the conventional air detraining (defoamer) compositions may be employed with the comb-type PC polymer described herein, and thus further exemplary methods and compositions of the invention further comprise one or more air detraining agents.

Further compositions and methods of the invention may further comprise or include the use of at least one other agent selected from the group consisting of (i) a non-high range water reducer (non-HRWR) such as gluconic acid and its salts; (ii) an alkanolamine such as triethanolamine, triisopropanolamine, diethylisopropanolamine, or mixture thereof; (ii) a second defoamer which is different in terms of chemical structure from the first defoamer employed, (iv) an air-entraining agent such as a higher trialkanolamine such as triisopropanolamine or diethylisopropanolamine, a lignosulfonate, a naphthalene sulfonate, a melamine sulfonate, an oxyalkylene-containing non-HRWR plasticizer, an oxyalkylene-containing shrinkage reducing agent (which does not function as a HRWR additive), or a mixture thereof.

The present invention also relates to hydratable cementitious compositions which are made by combining the comb-type carboxylate polymer (made from components A, B, C, and optionally D), and optional additional chemical admixtures, as just described above.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are based on weight or percentage by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: $R=RL+k*(RU-RL)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above, is also specifically disclosed.

Example 1

This section describes an exemplary process for making a comb-type carboxylate copolymer for low-to-mid-range water reduction use in accordance with the present invention. A three-neck round bottom flask was fitted with a mantle heater, a thermocouple connected to temperature controller and a mechanical stirrer. The reactor was charged with a prescribed amount of de-ionized water, purged with argon gas and then heated to 65° C. A solution containing prescribed amounts of two poly(ethylene glycol)methyl ether methacrylate (MPEGMA) having different molecular weights, acrylic acid (AA), 3-mercaptopropionic acid and de-ionized water was prepared in advance. Separately, a solution of ammonium persulfate in de-ionized water was prepared. Once the temperature of the reactor reached 65° C., both solutions were added drop-wise over a period of 5.0 hours while stirring. After the addition was completed, the reaction was continued for another 1.0 hour at 68-70° C. and then stopped by cooling to ambient temperature.

Gel Permeation Chromatograph (GPC) Conditions.

The weight-average molecular weights of the resulting polymers can be measured by employing gel permeation chromatography (GPC), using polyethylene glycol (PEG) as standards and the following separation columns: ULTRAHYDROGEL™ 1000, ULTRAHYDROGEL™ 250 and ULTRAHYDROGEL™ 120 columns. The GPC processing conditions are as follows: 1% aqueous potassium nitrate as elution solvent, flow rate of 0.6 mL/min., injection volume of 80 µL, column temperature at 35° C., and refractive index detection.

Table 1 summarizes the results of the carboxylate polymer samples of this invention as well as of the reference samples. Reference 1 was synthesized via the same process and contains poly(ethylene glycol)methyl ether methacrylate while Reference 2 is a commercial polycarboxylate containing isoprenyl poly(ethylene glycol) ether and acrylic acid.

TABLE 1

| Sample Identification | MW of PEG in Monomer (A) | MW of PEG in Monomer (B) | Monomer (A) [mol] | Monomer (B) [mol] | Monomer (C) [mol] | Weight-average Mw [Da] |
|---|---|---|---|---|---|---|
| Sample 1 | 1,100 | 2,000 | 0.50 | 0.50 | 2.50 | 17,000 |
| Sample 2 | 500 | 1,100 | 0.25 | 0.75 | 2.00 | 16,000 |
| Reference 1 | — | 2,000 | — | 1.00 | 2.50 | 18,000 |
| Reference 2 | — | 2,200 | — | 1.00 | 4.30 | 40,000 |

Example 2

This example illustrates the water-reducing effect of the comb-type carboxylic copolymers of the present invention by measuring the slump of concrete. Concrete mixes were fabricated using three different mix proportions as shown in Table 2. The amount of water varied depending on the type and amount of cement and depending on the weight ratios of water to cement (w/c). The results shown in Table 3 below are based on cement sourced from Holcim Theodore plant (Alabama, US), slump was measured as a function of percentage of active polymer dosage to cement [% s/c].

TABLE 2

| Cement (lb/yd$^3$) | 650 | 564 | 517 |
|---|---|---|---|
| Sand (lb/yd$^3$) | 1441 | 1439 | 1384 |
| Stone ⅜" (lb/yd$^3$) | 425 | 425 | 438 |
| Stone ¾" (lb/yd$^3$) | 1275 | 1275 | 1313 |

TABLE 3

| Sample ID | 650 lbs of cement w/c = 0.38 Dosage [% s/c] | 650 lbs of cement w/c = 0.38 Slump [mm] | 650 lbs of cement w/c = 0.38 Dosage [% s/c] | 650 lbs of cement w/c = 0.38 Slump [mm] | 564 lbs of cement w/c = 0.53 Dosage [% s/c] | 564 lbs of cement w/c = 0.53 Slump [mm] | 564 lbs of cement w/c = 0.53 Dosage [% s/c] | 564 lbs of cement w/c = 0.53 Slump [mm] | 517 lbs of cement w/c = 0.60 Dosage [% s/c] | 517 lbs of cement w/c = 0.60 Slump [mm] |
|---|---|---|---|---|---|---|---|---|---|---|
| Sample 1 | 0.10 | 6.63 | 0.09 | 3.13 | 0.07 | 6.88 | 0.05 | 5.25 | 0.05 | 6.50 |
| Sample 2 | 0.10 | 5.00 | 0.09 | 2.88 | 0.07 | 7.25 | 0.05 | 5.13 | 0.05 | 6.63 |
| Reference 1 | — | — | — | — | 0.07 | 6.13 | 0.05 | 4.50 | 0.05 | 5.50 |
| Reference 2 | 0.10 | 7.88 | 0.09 | 6.63 | — | — | — | — | 0.05 | 5.75 |

As shown in Table 3, Sample 1 and Sample 2 exhibited higher slump than both Reference samples at water to cement ratios of 0.53 and 0.60 even at equal polymer dosages. These results indicate the greater water-reducing efficiency, at these water to cement ratios, of the carboxylate polymer having lower molecular weight poly(ethylene glycol) units.

Example 3

In this example, the performance of the comb-type copolymers of the invention was evaluated in a different cement, sourced from Holcim's Ste. Genevieve plant (Missouri, US). The test protocol described in Example 2 was employed and the results are summarized in Table 4.

TABLE 4

| Sample ID | 650 lbs of cement w/c = 0.42 | | 650 lbs of cement w/c = 0.42 | | 564 lbs of cement w/c = 0.53 | | 517 lbs of cement w/c = 0.60 | |
|---|---|---|---|---|---|---|---|---|
| | Dosage [% s/c] | Slump [mm] | Dosage [% s/c] | Slump [mm] | Dosage [% s/c] | Slump [mm] | Dosage [% s/c] | Slump [mm] |
| Sample 1 | 0.09 | 7.13 | 0.07 | 4.88 | 0.06 | 7 | 0.05 | 6.13 |
| Sample 2 | 0.09 | 7.00 | 0.07 | 4.63 | 0.06 | 7.38 | 0.05 | 6.00 |
| Reference 1 | 0.09 | 7.63 | 0.07 | 5.63 | 0.06 | 6.13 | 0.05 | 5.00 |
| Reference 2 | 0.09 | 8.00 | 0.07 | 6.25 | — | — | 0.05 | 5.63 |

The results in Table 4 indicate that the comb-type copolymers have two different polyoxyalkylene side chains outperformed the Reference polymers when the water to cement ratio is increased.

Example 4

In this example, the performance of the comb-type copolymers of the invention was evaluated in a third cement, sourced from LaFarge's Ravena plant (New York, US). The test protocol described in Example 2 was employed and the results are summarized in Table 5.

TABLE 5

| Sample ID | 650 lbs of cement w/c = 0.42 | | 564 lbs of cement w/c = 0.53 | | 517 lbs of cement w/c = 0.60 | |
|---|---|---|---|---|---|---|
| | Dosage [% s/c] | Slump [mm] | Dosage [% s/c] | Slump [mm] | Dosage [% s/c] | Slump [mm] |
| Sample 1 | 0.09 | 5.50 | 0.06 | 6.00 | 0.05 | 5.50 |
| Sample 2 | 0.09 | 5.75 | 0.06 | 5.88 | 0.05 | 5.63 |
| Reference 1 | — | — | 0.06 | 4.13 | 0.05 | 4.88 |
| Reference 2 | 0.09 | 7.88 | — | — | 0.05 | 5.00 |

Again, the results in this table confirmed that when the ratio of water to cement increases, Sample 1 and Sample 3 of the invention outperformed conventional superplasticizers (Reference 1 and Reference 2).

Example 5

This example compares the slump retaining performance of the comb-type copolymers against the reference polymers. The test protocol described in Example 2 was employed, except that the slump was measured at 10-minute, 30-minute, and 45-minute or 50-minute marks. The results are shown in Tables 6, 7, and 8 for three different cements mentioned above (e.g., sourced from Holcim's Theodore, Holcim's Ste. Genevieve; and LaFarge's Ravena, respectively).

TABLE 6

| | 564 lbs of cement w/c = 0.53 | | | |
|---|---|---|---|---|
| | Dosage | Slump [mm] | | |
| Sample ID | [% s/c] | 10 min | 30 min | 45 min |
| Sample 1 | 0.075 | 8.13 | 6.75 | 5.88 |
| Sample 2 | 0.075 | 8.38 | 7.00 | 5.63 |

TABLE 6-continued

| | 564 lbs of cement w/c = 0.53 | | | |
|---|---|---|---|---|
| | Dosage | Slump [mm] | | |
| Sample ID | [% s/c] | 10 min | 30 min | 45 min |
| Reference 1 | 0.075 | 7.38 | 5.75 | 4.75 |
| Reference 2 | 0.075 | 7.13 | 5.88 | 4.63 |

TABLE 7

| | 564 lbs of cement w/c = 0.54 | | | |
|---|---|---|---|---|
| | Dosage | Slump [mm] | | |
| Sample ID | [% s/c] | 10 min | 30 min | 50 min |
| Sample 1 | 0.075 | 8.13 | 5.75 | 3.63 |
| Sample 2 | 0.075 | 8.38 | 6.38 | 4.63 |
| Reference 1 | 0.075 | 7.50 | 5.38 | 3.63 |
| Reference 2 | 0.075 | 7.25 | 5.50 | 3.63 |

TABLE 8

| | 564 lbs of cement w/c = 0.55 | | | |
|---|---|---|---|---|
| | Dosage | Slump [mm] | | |
| Sample ID | [% s/c] | 10 min | 30 min | 45 min |
| Sample 1 | 0.06 | 6.63 | 4.88 | — |
| Sample 2 | 0.06 | 7.00 | 5.25 | 4.13 |
| Reference 1 | 0.06 | 6.00 | 4.00 | — |

It is clear from these tables that both Sample 1 and Sample 2 of this invention exhibit good workability and slump retaining performance.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Skilled artisans can make variations and changes based on the specification without departing from the spirit of the invention.

It is claimed:

1. A method for achieving low-to-mid-range water reduction in a hydratable cementitious composition, comprising: combining with water and cement to form a hydratable cementitious mixture, wherein the water-to-cement (w/c) ratio is at least 0.44 and no greater than 0.80, and further combining with the water and cement at least one comb-type carboxylate copolymer formed from the following monomer components (A), (B), (C), and optionally (D):

(A) a first polyoxyalkylene monomer represented by structural formula:

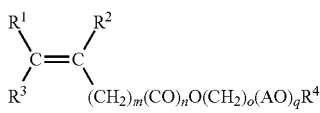

wherein $R^1$ and $R^2$ individually represent hydrogen atom or methyl group; $R^3$ represents hydrogen or —COOM group wherein M represents a hydrogen atom or an alkali metal; AO represents oxyalkylene group having 2 to 4 carbon atoms or mixtures thereof; "m" represents an integer of 0 to 2; "n" represents an integer of 0 or 1; "o" represents an integer of 0 to 4; "p" represents an average number of oxyalkylene groups and is an integer from 8-25; and $R^4$ represents a hydrogen atom or $C_1$ to $C_4$ alkyl group;

(B) a second polyoxyalkylene monomer represented by structural formula:

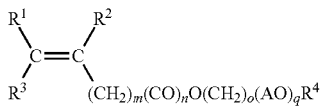

wherein $R^1$ and $R^2$ individually represent hydrogen atom or methyl group; $R^3$ represents hydrogen or —COOM group wherein M represents a hydrogen atom or an alkali metal; AO represents an oxyalkylene group having 2 to 4 carbon atoms or mixtures thereof; "m" represents an integer of 0 to 2; "n" represents an integer of 0 or 1; "o" represents an integer of 0 to 4; "q" represents an average number of oxyalkylene groups and is an integer from 20 to 100; and $R^4$ represents a hydrogen atom or $C_1$ to $C_4$ alkyl group;

(C) an unsaturated carboxylic acid monomer represented by structural formula:

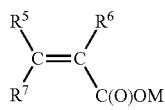

wherein $R^5$ and $R^6$ individually represent hydrogen atom or methyl group; $R^7$ represents hydrogen atom, $C(O)OR^8$, or $C(O)NH\ R^8$ wherein $R^8$ represents a $C_1$ to $C_4$ alkyl group, and M represents a hydrogen atom or an alkali metal; and, optionally, (D) an unsaturated, water-soluble monomer represented by structural formula:

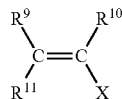

wherein $R^9$, $R^{10}$, and $R^{11}$ each independently represent a hydrogen atom, methyl group or $C(O)OH$; X represents $C(O)NH_2$, $C(O)NHR^{12}$, $C(O)NR^{13}R^{14}$, $O-R^{15}$, $SO_3H$, $C_6H_4SO_3H$, or $C(O)NHC(CH_3)_2CH_2SO_3H$, or mixture thereof, wherein $R^{12}$, $R^{13}$, $R^{14}$, and $R^{15}$ each independently represent a $C_1$ to $C_5$ alkyl group; and wherein the molar ratio of component (A) to component (B) is from 15:85 to 85:15, and further wherein the molar ratio of component (C) to the sum of component (A) and component (B) is 90:10 to 50:50;

wherein the difference between "q" in said second polyoxyalkylene monomer of component (8) and "p" in said first polyoxyalkylene monomer of component (A) is an integer of at least 8; and where the water content of a concrete prepared by the method is reduced by less than 12 percent while attaining same slump compared to the concrete mixture not treated with the polymer.

2. The method of claim 1 wherein said hydratable cementitious mixture is a concrete having a cement to concrete ratio within the range of 240 to 340 kg/m³.

3. The method of claim 1 wherein, in said first and second monomer components (A) and (B), the polyoxyalkylene is polyoxyethylene.

4. The method of claim 1 wherein "m", "n", and "o" in component (A) or component (B) are integers of 0, 1, and 0, respectively.

5. The method of claim 1 wherein, the sum of "p" in said first polyoxyalkylene monomer of component (A) and "q" in said second polyoxyalkylene monomer of component (B) is no more than 120.

6. The method of claim 5 wherein the sum of "p" in said first polyoxyalkylene monomer of component (A) and "q" in said second polyoxyalkylene monomer of component (B) is no more than 80.

7. The method of claim 1 wherein the molar ratio of component (A) to component (B) is from 20:80 to 75:25.

8. The method of claim 1 wherein the molar ratio of component (A) to component (B) is from 25:75 to 65:35.

9. The method of claim 1 wherein the molar ratio of component (C) to the sum of component (A) and component (B) is 80:20 to 60:40.

10. The method of claim 1 wherein the molar ratio of component (C) to the sum of component (A) and component (B) is 75:25 to 65:35.

11. The method of claim 1 wherein said at least one carboxylate copolymer further comprises constituent groups derived from polymerization using component (D) monomer, and the molar ratio of constituent groups derived from component (D) to the sum of constituent groups derived from component (A), component (B), and component (C) is 1:99 to 20:80.

12. The method of claim 1 wherein said at least one comb-type carboxylate copolymer has a weight-average molecular weight of 10,000-40,000.

13. The method of claim 1 wherein said at least one comb-type carboxylate copolymer has a weight-average molecular weight of 12,000-30,000.

14. The method of claim 1 wherein the weight ratio of water to cement is larger than 0.51.

15. The method of claim 1 wherein the active amount of said comb-type carboxylate copolymer is from 0.04 to 0.14% by weight of cement.

16. The method of claim 15, wherein the active amount of said comb-type carboxylate copolymer is from 0.05 to 0.11% by weight of cement.

17. The method of claim 1 further comprising adding to the cement and water at least one admixture chosen from gluconic acid or salt thereof, an alkanolamine, an air detraining agent, an air-entraining agent, and mixtures thereof.

18. The method of claim 17 wherein said at least one admixture is chosen from gluconic acid or salt thereof is mixed with said carboxylate copolymer prior to combining with said cement and water.

19. The method of claim 1 wherein said at least one comb-type carboxylate copolymer consists essentially of constituents formed from using only monomer components (A), (B), and (C).

20. A cementitious composition made by the method of claim 1.

* * * * *